(12) United States Patent
Uchibori

(10) Patent No.: US 7,234,142 B1
(45) Date of Patent: Jun. 19, 2007

(54) TASK PROCESSING SYSTEM

(75) Inventor: Shusaku Uchibori, Tokyo (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 09/588,725

(22) Filed: Jun. 7, 2000

(30) Foreign Application Priority Data

Jun. 9, 1999 (JP) .................................. 11-162702

(51) Int. Cl.
G06F 9/46 (2006.01)
G06F 7/00 (2006.01)

(52) U.S. Cl. ...................... 718/102; 718/100; 718/104; 710/8

(58) Field of Classification Search ................ 709/100, 709/101, 201; 718/100–108; 710/240, 8; 711/136; 705/9; 707/4
See application file for complete search history.

(56) References Cited

U.S. PATENT DOCUMENTS

| | | | | |
|---|---|---|---|---|
| 4,636,946 A * | 1/1987 | Hartung et al. | ............ | 711/136 |
| 4,685,125 A * | 8/1987 | Zave | .............................. | 700/1 |
| 5,251,317 A * | 10/1993 | Iizuka et al. | ................ | 718/104 |
| 5,337,258 A * | 8/1994 | Dennis | ......................... | 714/47 |
| 5,361,369 A * | 11/1994 | Kametani | .................... | 718/106 |
| 5,437,032 A * | 7/1995 | Wolf et al. | ................. | 709/103 |
| 5,867,675 A * | 2/1999 | Lomelino et al. | ........... | 710/240 |
| 5,999,990 A * | 12/1999 | Sharrit et al. | ................... | 710/8 |
| 6,092,048 A * | 7/2000 | Nakaoka | ........................ | 705/9 |
| 6,243,735 B1 * | 6/2001 | Imanishi et al. | ............ | 718/102 |
| 6,243,788 B1 * | 6/2001 | Franke et al. | ................... | 711/3 |
| 6,338,056 B1 * | 1/2002 | Dessloch et al. | .............. | 707/2 |
| 6,421,667 B1 * | 7/2002 | Codd et al. | ..................... | 707/4 |
| 6,512,591 B1 * | 1/2003 | Mesa et al. | ................ | 358/1.15 |
| 6,578,006 B1 * | 6/2003 | Saito et al. | ..................... | 705/9 |
| 6,678,716 B1 * | 1/2004 | Pronsati et al. | ............. | 709/201 |

FOREIGN PATENT DOCUMENTS

| | | |
|---|---|---|
| JP | 2-12529 | 1/1990 |
| JP | 7-244595 | 9/1995 |
| JP | 2561801 | 9/1996 |
| JP | 08-314739 | 11/1996 |
| JP | 10-326197 | 12/1998 |

* cited by examiner

Primary Examiner—Lewis A. Bullock, Jr.
Assistant Examiner—Jennifer N. To
(74) Attorney, Agent, or Firm—McGinn IP Law Group, PLLC

(57) ABSTRACT

To improve the task processing speed, when a large number of small-sized tasks are executed. When a task is completed, the event check means checks whether or not an event of the same kind as that of the event which created the completed task is registered in the event storing unit. When it is not registered, the resources which have been used by the completed task and should be rewritten are returned from the task resource management means to the task resource storing unit. When an event of the other kinds is registered in the event storing unit, the task creation and resource acquisition are repeated. When an event of the same kind is registered, the same task is continuously processed without release and re-acquisition of resource.

13 Claims, 5 Drawing Sheets

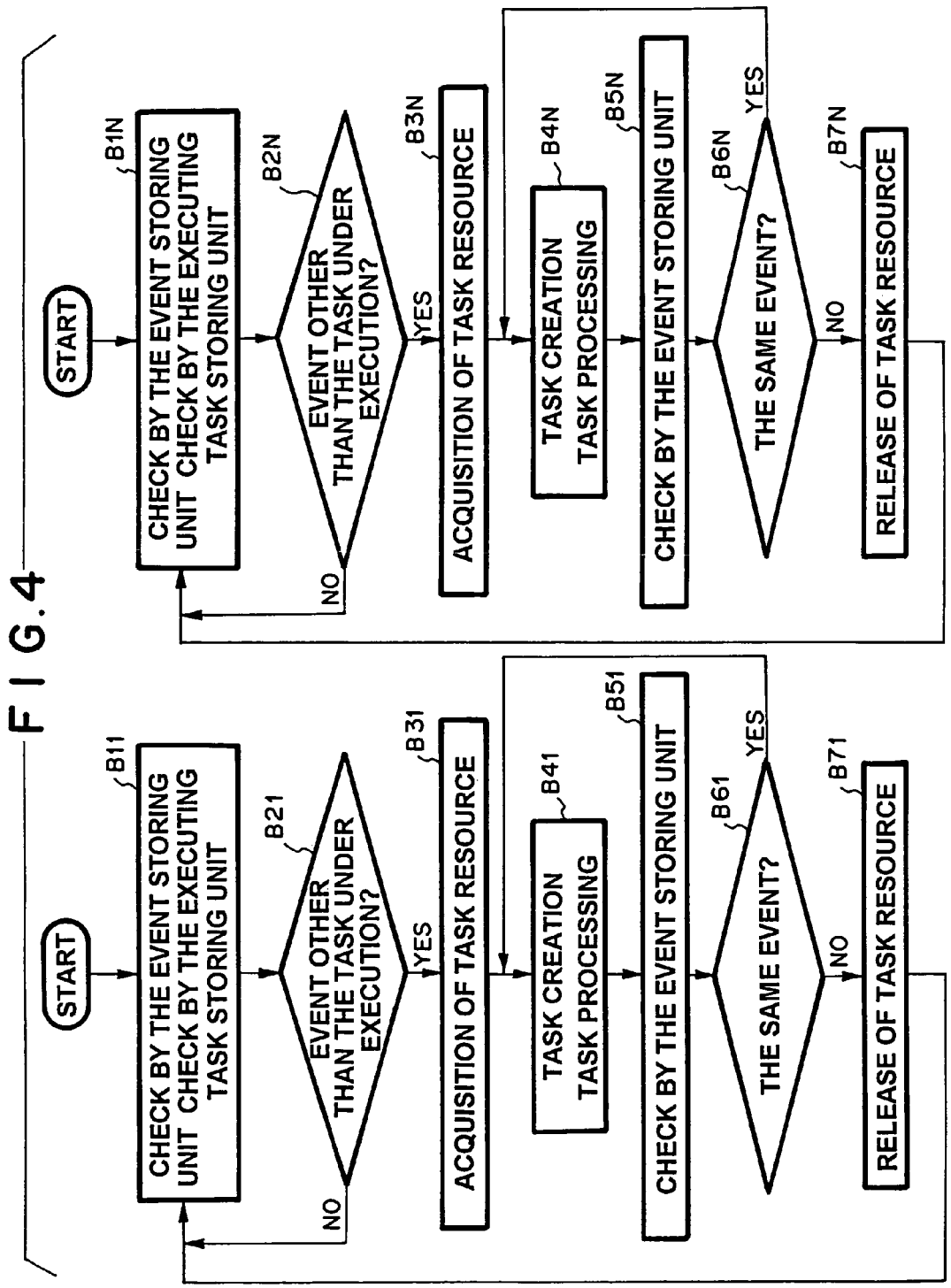

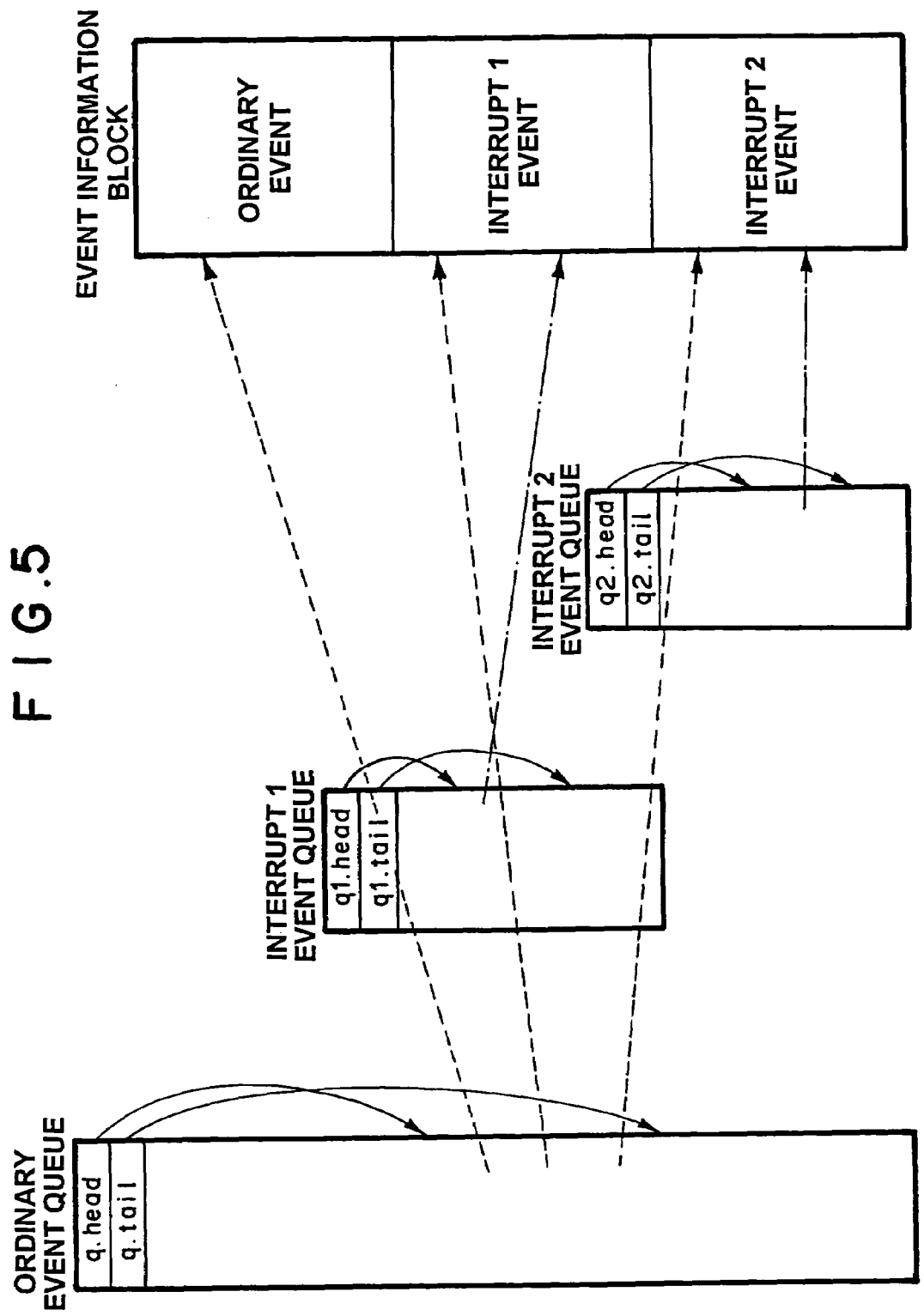

TASK PROCESSING SYSTEM

BACKGROUND OF THE INVENTION

1. Technical Field of the Invention

The present invention relates to a task processing system, and particularly, to a task processing system for speeding up task processing by controlling generation of overhead for task switching in the case of processing a large number of small sized tasks.

2. Description of the Prior Art

In a conventional task processing system, when the tasks to be processed are known in advance, the task processing speed of the system is optimized by scheduling the tasks beforehand.

On the other hand, when it is impossible to schedule the tasks, the tasks are processed as asynchronous events such as interrupts. For example, in the "Queue Processing Method" as disclosed in JP10-326197 A (1998), ordinary events from software and interrupt events caused by a timer or hardware interrupt are accepted at any time, and are registered into an input key. Then, they are executed sequentially without prohibiting interrupt.

As shown in FIG. 5, in the above-mentioned "Queue Processing Method", the queue entries of ordinary events and interrupt events are prepared. When interrupt 1 event occurs, its content is stored in interrupt 1 event information block, and its event queue is added to the interrupt 1 event queue. Interrupt 2 event is processed in the same way. The data stored in the interrupt 1 event information block and the interrupt 2 event information block is registered again as the ordinary event, by releasing the registration of the interrupt event queue without transferring it to the ordinary event information block.

However, the above-mentioned conventional task processing system has a disadvantage that it cannot improve the speed of the task processing of the whole system, because it is impossible to schedule the tasks beforehand. Therefore, it becomes necessary to generate overheads for acquiring and releasing the resources necessary for the task processing.

The conventional task processing system has another disadvantage that it is not suitable for processing a large number of small-sized tasks, because a lot of overheads for task switching becomes necessary.

SUMMARY OF THE INVENTION

Therefore, an object of the present invention is to speed up the task processing by controlling the overhead generation for task switching in the case of processing a large number of small-sized tasks.

The task processing system of the present invention comprises a storage means for storing an identifier of a generated event, a task control device for creating a task based on the above event, and a task processing device for processing the task. The task processing device searches the identifier for creating the same task as the processed task, so as to further process the same task as the processed task.

The task processing system of the present invention processes a task depending on the kind of a created event. Concretely, it checks whether or not an event of the same kind occurred, after completion of the task processing. When an event of the same kind has occurred, the same task is continuously processed. Therefore, the overhead for acquiring and releasing resources necessary for the task processing is reduced, thereby speeding up the task processing on the whole system.

According to the present invention, it is possible to speed up the task processing in the whole system, because the overheads for acquiring and releasing a resource necessary for the task processing are reduced.

Further, according to the present invention, it is possible to process a large number of small-sized tasks at higher speed, because the tasks are switched at higher speed, due to the overhead reduction.

BRIEF EXPLANATION OF THE DRAWINGS

FIG. 4 is a flow chart for describing the operation of the task processing system as shown in FIG. 3.

FIG. 5 is a sequence diagram for explaining a conventional queue processing method.

PREFERRED EMBODIMENT OF THE INVENTION

Figure 1:
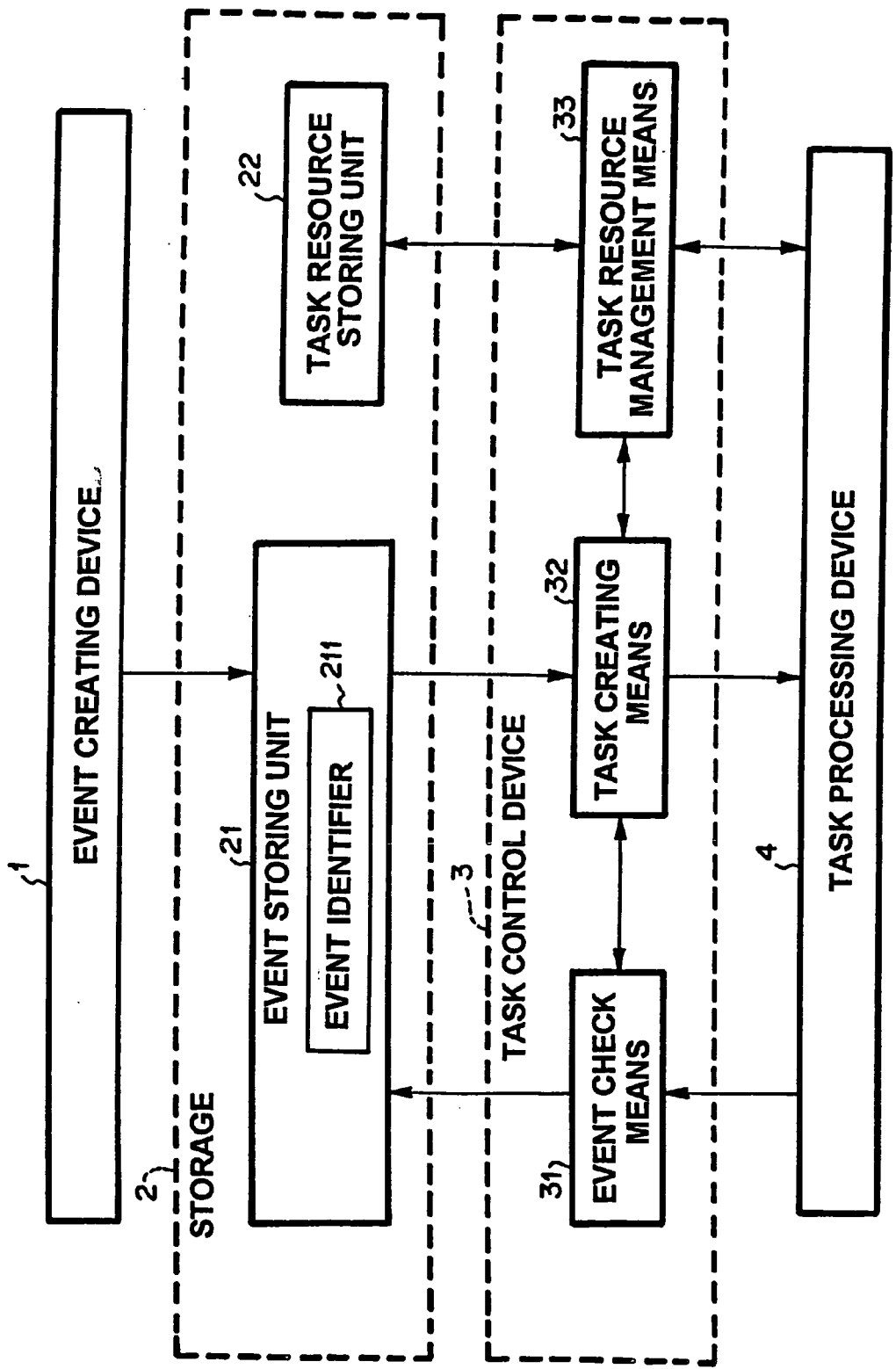
FIG. 1 is a block diagram of the task processing system of the first embodiment of the present invention.

A block diagram of the task processing system of the present invention is shown in FIG. 1. The task processing system as shown in FIG. 1 comprises event creating device 1 such as an interrupt creating device, storage means 2 for storing information, task processing device 4 operated by a program control, and task control device 3 for controlling task processing device 4, depending on the created event.

Storage means 2 comprises event storing unit 21 for storing the events created by event creating device 1, and task resource storing unit 22 for storing the resources necessary for the task processing of programs and data. An event stored in event storing unit 21 includes event identifier 211 for identifying the kind of the event.

Task control device 3 comprises event check means 31, task creating means 32, and task resource management means 33.

When task processing device 4 completes the task processing, event check means 31 checks whether the event for creating the same task as the completed task is registered in the event storing unit 21. Event identifier 211 is used for the check.

Task creating means 32 controls task processing device 4 so as to activate a task corresponding to the event registered in event storing unit 21. Event identifier 211 identifies the corresponding task.

Task resource management means 33 acquires a resource at the time of starting the task, and releases the resource at the time of completing the task.

The task corresponding to the event registered in event storing unit 21 is created by task creating means 32, and processed by task processing device 4. The resource necessary for the task processing is read out from task resource storing unit 22 by task resource management means 33, and supplied to the task processing device 4. Thus, the necessary resource is acquired.

At the time when the task processing has been completed in task processing device 4, event check means 31 checks whether an event of the same kind as that of the event having created the completed task is registered in event storing unit 21. When it is not registered, a resource required to be rewritten to the task resource storing unit 22, among the resources required by the completed task, is returned back to task resource storing unit 22, through the task resource management means 33. Thus, the resource is released.

When an event of the other kinds is registered in event storing unit 21, the task creation and resource acquisition are repeated. When an event of the same kind as that of the event having created the completed task is registered in event storing unit 21, the same task is continuously processed by task processing device 4 without releasing the resource.

Thus, sequential execution of the same task helps to reduce the overhead for the release and acquisition of resources, when various tasks are processed, thereby speeding up the task processing on the whole system.

Figure 2:
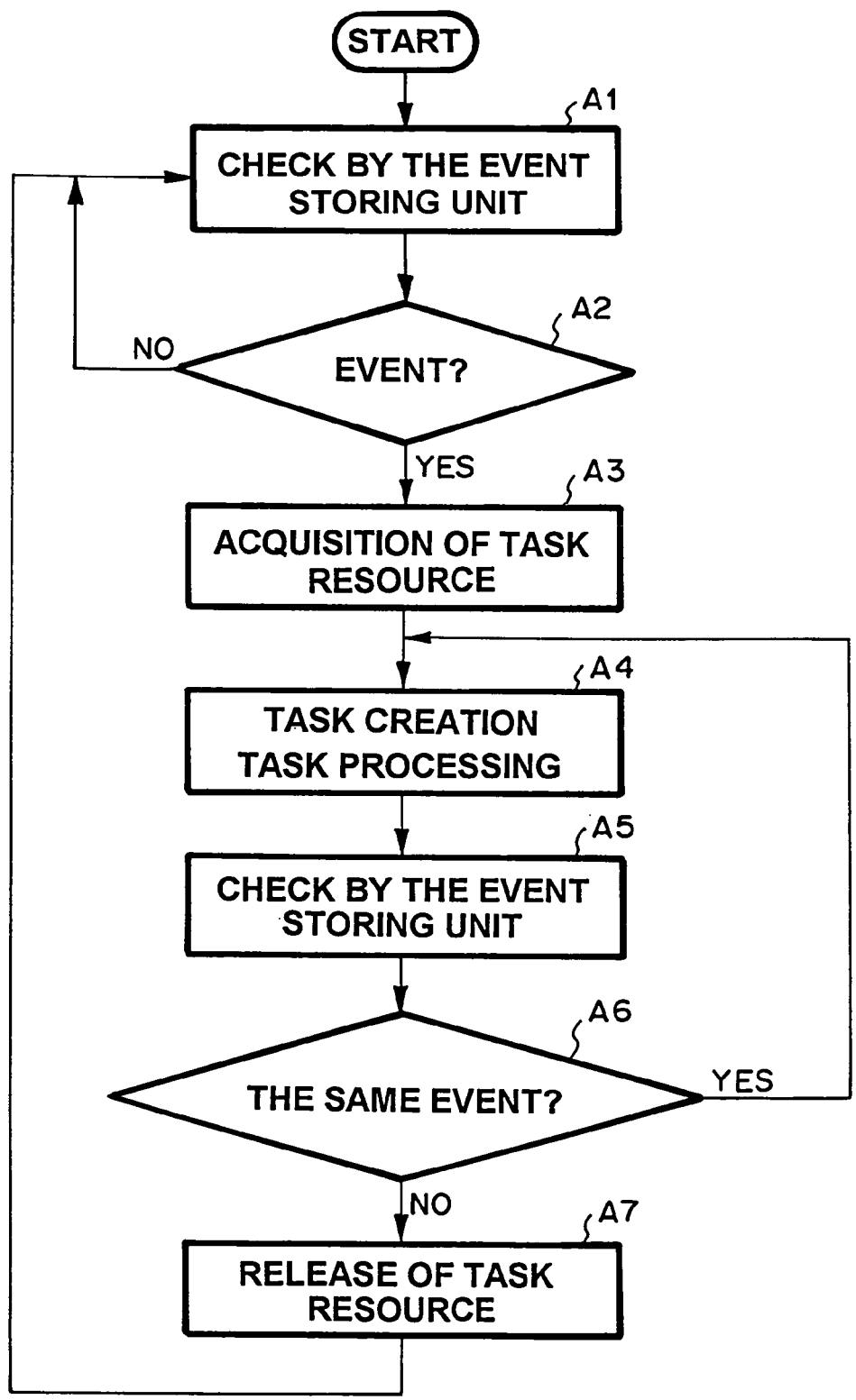
FIG. 2 is a flow chart for describing the operation of the task processing system as shown in FIG. 1.

FIG. 2 is a flow chart for describing the operation of the task processing system of the present invention. An event created by event creating device 1 is stored in event storing unit 21. Event identifier 211 indicating the kind of the event is also stored in event storing unit 21.

Event check means 31 checks whether an event having a specified identifier is stored in event storing unit 21 (Steps A1 and A2).

When the event having the specified identifier is stored, task resource management means 33 reads out a resource necessary for the task corresponding to event identifier 211 from task resource storing unit 22 and feeds the read out resource to the task processing device 4 (Step A3).

Further, task creating means 32 activates or creates a task corresponding to event identifier 211, by using task processing device 4, while the corresponding event is deleted from event storing unit 21 (Step A4).

Event check means 31 checks whether an event having the same identifier as event identifier 211 corresponding to the completed task is stored in event storing unit 21 (Steps A5 and A6).

When an event having the same identifier is stored, the step returns to Step A4, where the same task as the completed task is created by task creating means 32, and the corresponding event is deleted from event storing unit 21.

Finally, when an event having the same identifier is not stored, task resource management means 33 rewrites, into task resource storing unit 22, the resource which has been used by the completed task and should be released (Step A7).

Figure 3:
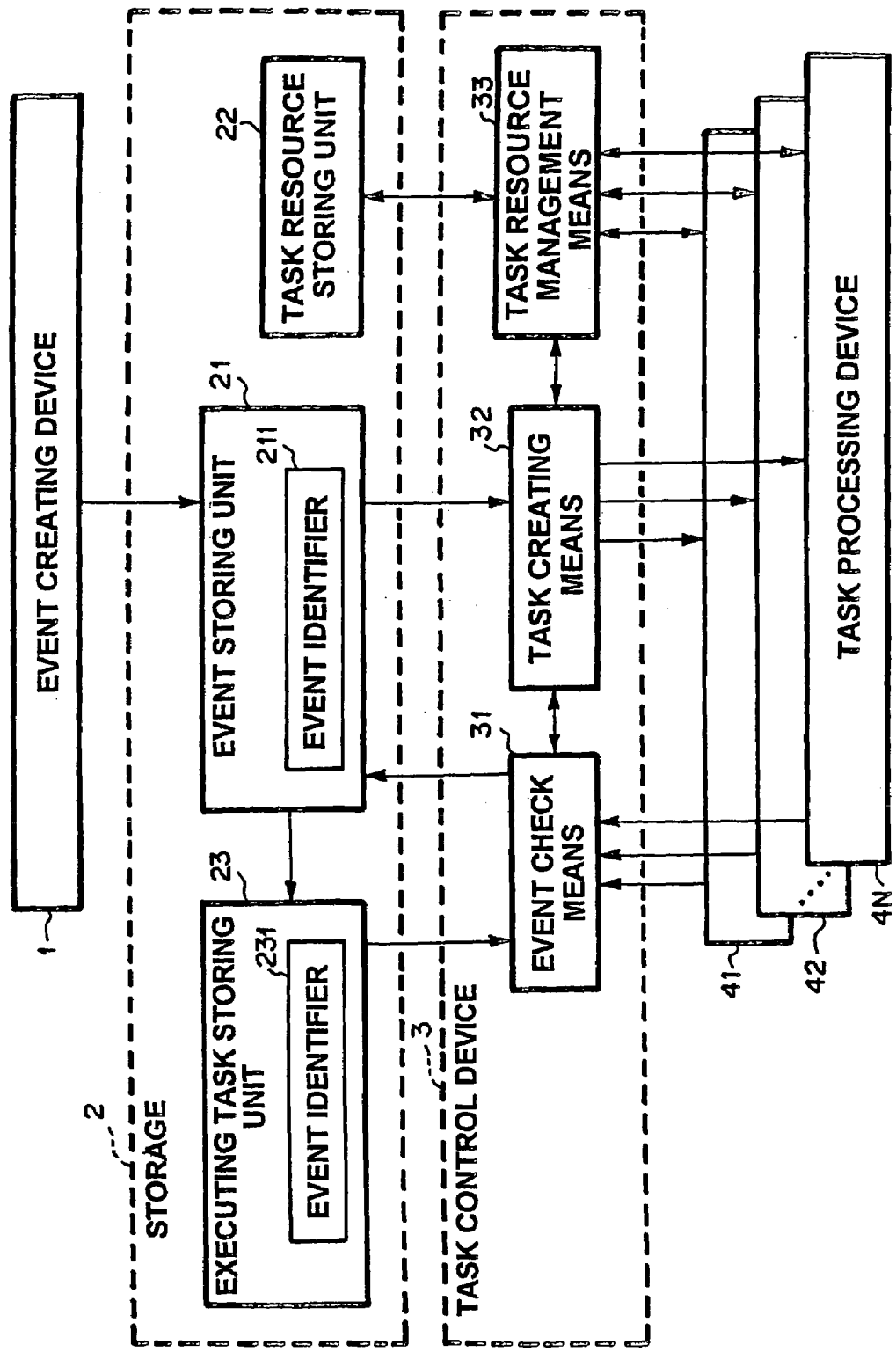
FIG. 3 is a block diagram of the task processing system of the second embodiment of the present invention.

A block diagram of another embodiment of the task processing system of the present invention is shown in FIG. 3. The embodiment as shown in FIG. 3 is different from the embodiment as shown in FIG. 1 in that a plurality of task processing devices 41, 42, 4N are provided, in place of task processing device 4, and further in that storage means further comprises executing task storing unit 23.

Executing task storing unit 23 stores each task which is being executed by task processing devices 41 to 4N. The task stored by executing task storing unit 23 also includes event identifier 231 for identifying the kind of the task.

A flow chart for explaining the operation of the task processing system as shown in FIG. 3 is shown in FIG. 4. The flow charts are identical, and operating in parallel for the number N of task processing devices.

The operations of event check means 31, task creating means 32, and task resource management means 33 in this embodiment as shown from Step B31 to Step B61 in FIG. 4 are the same as those of respective means 31, 32, and 33 in the embodiment shown in FIG. 1.

The event created by event creating device 1 is stored in event storing unit 21. Event identifier 211 indicating the kind of the event is also stored in event storing unit 21.

Event check means 31 checks whether any other event having an identifier other than event identifier 231 of the task stored in executing task storing unit 23 is stored in event storing unit 21 (Steps B11 and B21).

In Step B41, task creating means 32 activates or creates a task corresponding to event identifier 211, by using task processing device 4, while the corresponding event is deleted from event storing unit 21 and simultaneously stored in executing task storing unit 23.

Finally, when no event having the same identifier is stored, in Step B71, task resource management means 33 rewrites, into task resource storing unit 22, a resource which have been used by the completed task and should be released. The corresponding task is deleted from the executing task storing unit 23.

What is claimed is:

1. A task processing system, comprising:
   a storage for storing an event identifier for each event of a plurality of events, wherein said event identifiers comprise a first event identifier corresponding to a first task;
   a task control device for creating a task based on at least one of said plurality of events, wherein said task control device executes a search for said first event identifier to create a second task the same as said first task; and
   a task processing device for executing a plurality of tasks, wherein the plurality of tasks comprise said first task and said second task,
   whereupon completing said first task of said plurality of tasks, said task processing device initiates a search for a second event identifier, and if said second event identifier is the same as said first event identifier corresponding to said first task, then processes said second task corresponding to said second event identifier using a resource used by said first task.

2. The task processing system according to claim 1, wherein a first resource used by said first task, which is completed, is released from said task processing device toward said storage, when said second event identifier is not the same as said first event identifier.

3. The task processing system according to claim 2, wherein said first resource is released from said storage, when said first resource is transferred from said storage via said task control device to said task processing device.

4. The task processing system according to claim 1, whereupon completing said first task, said processing device deletes said first event identifier from said storage.

5. The task processing system according to claim 1, wherein said storage includes a task resource storing unit.

6. The task processing system according to claim 1, wherein said task control device includes an event checker that identifies said event identifier for each task of said plurality of tasks.

7. The task processing system according to claim 1, wherein said task control device includes a task creator that creates a task corresponding to said event identifier.

8. The task processing system according to claim 1, wherein said task control device includes a task resource manager that transfers a task resource, corresponding to said event identifier, to said task processing unit.

9. A task system, comprising:
   a storage for storing an event identifier for each task of a plurality of tasks, wherein said event identifiers comprise a first event identifier corresponding to a first task; and
   a task processing device for executing a plurality of tasks; and a task control device, including:
- an event checker that identifies said event identifier for each task of said plurality of tasks;
- a task creator that creates a task corresponding to an identified event identifier: and
- a task resource manager that transfers a task resource, corresponding to said task, to said task processing device, wherein said task control device further executes a search for said first event identifier to create a second task the same as said first task;

whereupon completing said first task, said task processing device initiates a search for a second event identifier that corresponds to said second task and if said second event identifier is the same as said first event identifier, then processes said second task using a resource used by said first task.

10. The task system according to claim 9, whereupon completing said first task, said task processing device deletes said first event identifier from said storage.

11. The task system according to claim 9, wherein said storage comprises a task resource storing unit that stores a plurality of task resources corresponding to said plurality of tasks.

12. A method of processing a task, comprising:
- storing a first event identifier corresponding to a first event and a second event identifier corresponding to a second event;
- creating a first task corresponding to said first event;
- processing said first task with a first task resource;
- initiating a search for said first event identifier to create a second task the same as the first task;
- determining whether said a first event identifier corresponding to said first task is the same as said second event identifier corresponding to a second task;
- processing said second task with said first task resource, if said second event identifier is the same as said first event identifier; and
- acquiring a second task resource and processing said second task using said second task resource, if said second event identifier is not the same as said first event identifier.

13. The method of claim 12, further comprising deleting said first event identifier from an event storing unit upon completion of said processing of said first task.

* * * * *